May 30, 1967
H. V. GRANTLAND
3,322,340
INSTRUMENT FOR COMPUTING UNKNOWN MEASUREMENTS OF TRIANGULATIONS
Filed July 27, 1966
3 Sheets-Sheet 1
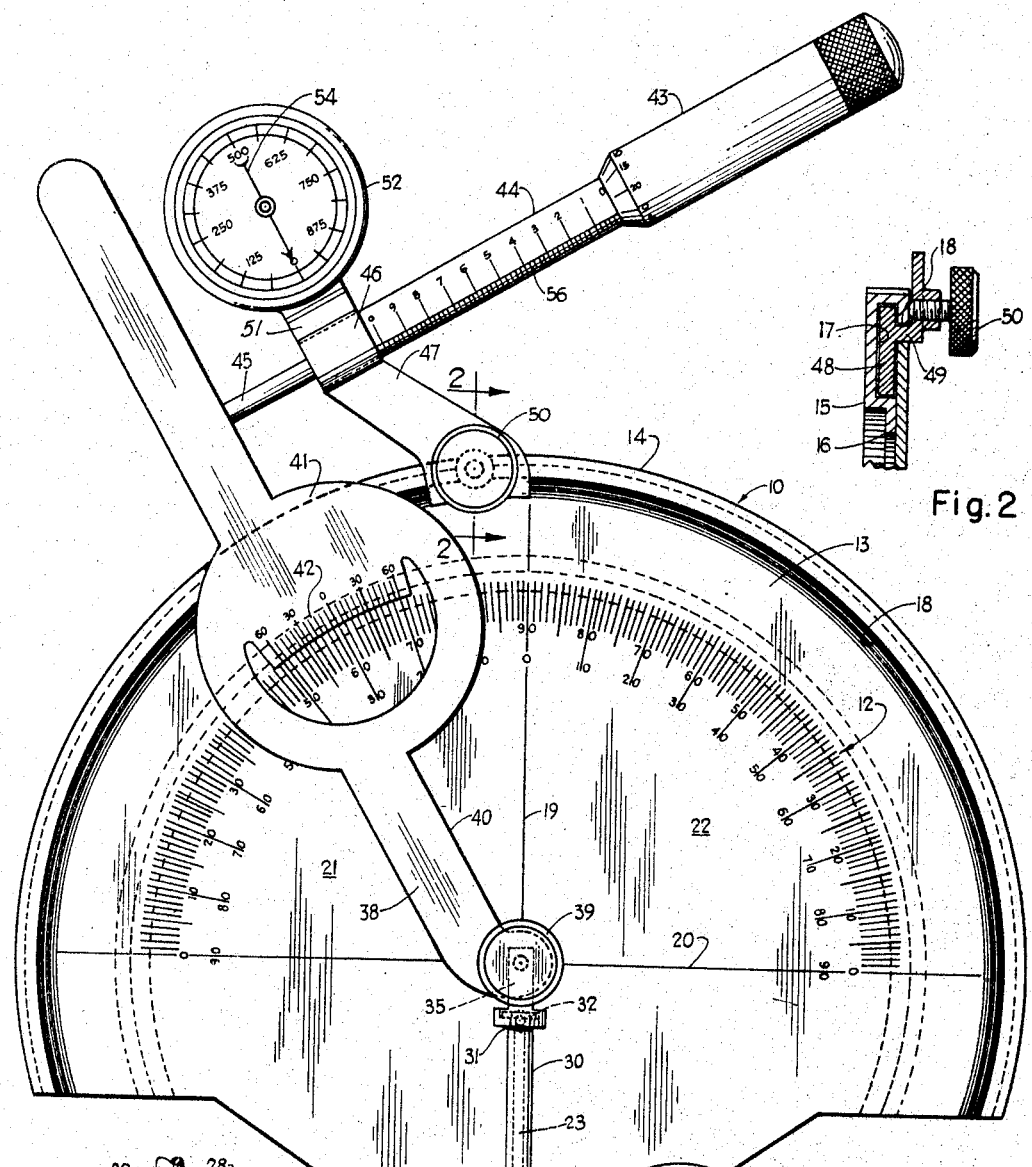
Fig. 2
Fig. 1
Fig. 3
INVENTOR
Henry V. Grantland
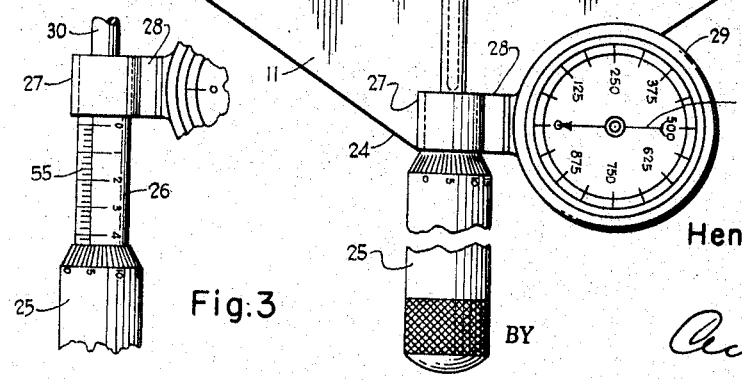
ATTORNEY May 30, 1967  H. V. GRANTLAND  3,322,340
INSTRUMENT FOR COMPUTING UNKNOWN MEASUREMENTS
OF TRIANGULATIONS
Filed July 27, 1966  3 Sheets-Sheet 2
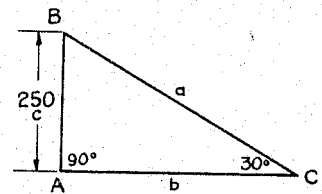
Fig. 6
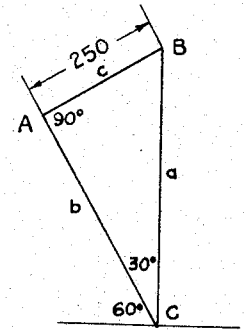
Fig. 7
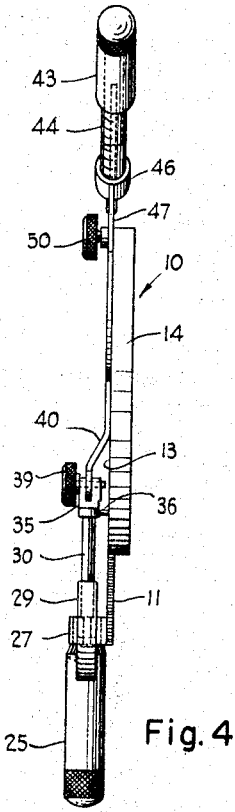
Fig. 4
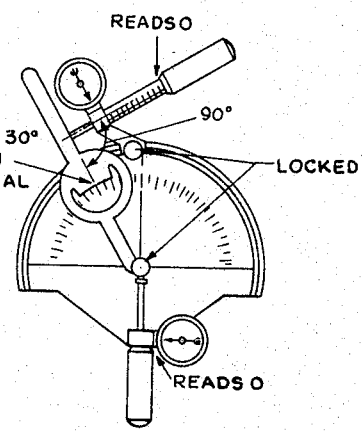
Fig. 8
Fig. 9
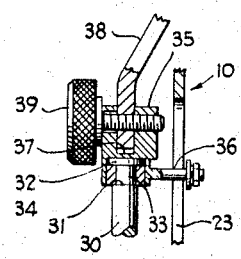
Fig. 5
Fig. 10
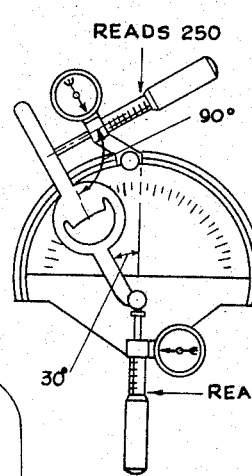
$a = c \times \text{Cosecant } C$
$a = 250 \times 2.000$
$a = 500'$
Fig. 11
INVENTOR
Henry V. Grantland
BY Cecil L. Wood
ATTORNEY May 30, 1967
H. V. GRANTLAND
3,322,340
INSTRUMENT FOR COMPUTING UNKNOWN MEASUREMENTS OF TRIANGULATIONS
Filed July 27, 1966
3 Sheets-Sheet 3
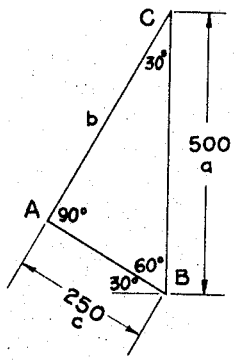
Fig. 12
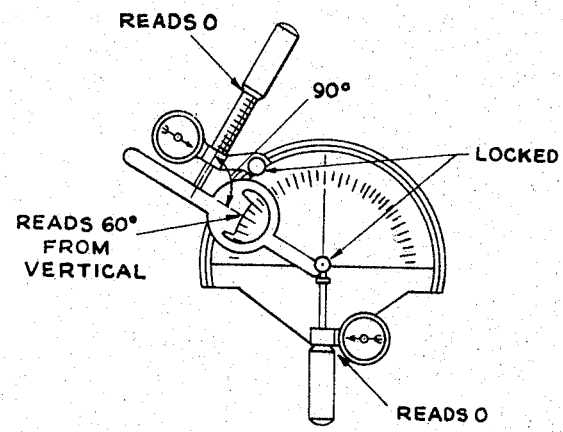
Fig. 13
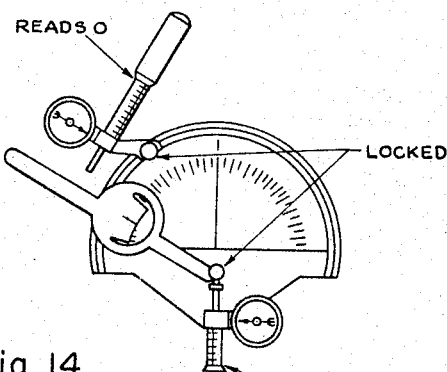
Fig. 14
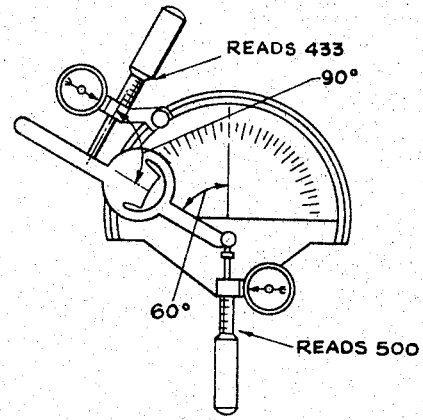
Fig. 15
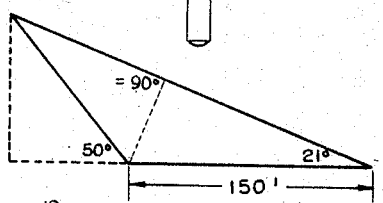
Fig. 17
$b = c \times \text{Cotangent } C$
$b = 250 \times 1.7320$
$b = 433'$
Fig. 16
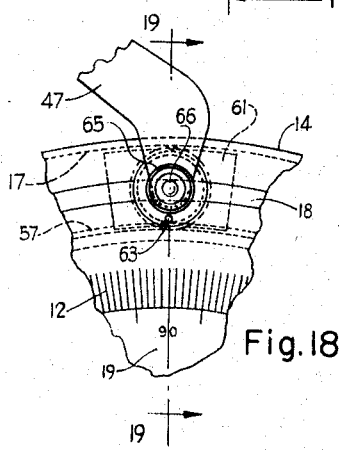
Fig. 18
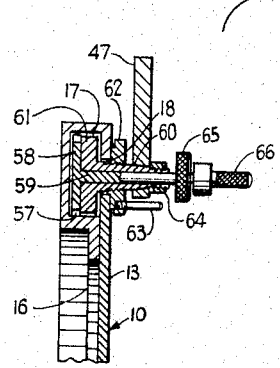
Fig. 19
INVENTOR
Henry V. Grantland
BY
*Cecil L. Rose*
ATTORNEY

United States Patent Office 3,322,340
Patented May 30, 1967

3,322,340
INSTRUMENT FOR COMPUTING UNKNOWN MEASUREMENTS OF TRIANGULATIONS
Henry V. Grantland, Rte. 3, Box 105,
Arlington, Tex. 76010
Filed July 27, 1966, Ser. No. 568,250
4 Claims. (Cl. 235—61)

This invention relates to calculating devices, and it has particular reference to an instrument for computing unknown measurements of either side of a triangle where the measurements and angulation of an acute angle and one lateral side thereof are known.

A prime object of the invention resides in the provision of an instrument which embodies a protractor scale and a vernier alignable therewith and operative in combination with a pair of micrometers, each having a vernier dial associated therewith and operated thereby to indicate fractional spacings such, for example, as a division of $\frac{1}{1000}$ representing .001", whereby accurate calculations can be made with a minimum of effort and by persons lacking in mathematical training.

An object of the invention is that of providing a relatively simple instrument, possessing few mechanical parts, enabling untrained persons to make calculations in triangulation or trigonometrical surveys, when used in conjunction with an engineer's transit, or the like, and is adapted to be scaled in such manner as to compute measurements in inches, feet, yards or miles, depending upon the purpose for which it is to be employed.

In computing the distance across one side of a triangle, where the measurements of two of its sides are known, it is necessary to use mathematical formulae by way of trigonometry, or other methods, such as by a slide rule, or the like. Such methods are sometimes tedious and generally beyond the knowledge of untrained individuals.

The invention is designed for the purpose of constructing such geometrical figures as right-angle triangles, equi-angular or equi-lateral triangles, isosceles triangles, and often the scalene or obtuse angle triangle, or any polygonal figure that is capable of being segregated or broken down into right-angle triangles, depending upon the known factors at hand, such as an acute angle. An important object of the invention, therefore, is that of providing an instrument which possesses features by which the lengths of any side of many triangles can be determined when the other sides are known factors.

Broadly, the invention contemplates the provision of an instrument by which the measurement of any side of a triangle of any type of angulation can be readily determined when the measurements of the other sides thereof are known, and such calculations can be made without the aid of mathematical formula. If a definite perpendicular can be assumed or established, in many cases the length of the unknown sides of some triangular figures can be determined. An obtuse triangle, for example, showing an established perpendicular line within so as to convert the obtuse angle triangle into two right angle triangles can be delineated. The same procedure is applied to isosceles triangles and equi-angular or equi-lateral triangles, simply by separating into two right angle triangles, for making calculations possible with the invention.

While the foregoing objects are paramount, other and lesser objects will become manifest as the description proceeds, taken in connection with the appended drawings wherein:

FIGURE 1 is an elevational view of the invention showing the semi-circular protractor scale, and the angle scale co-operating therewith, and illustrating a pair of co-acting micrometers on said protractor.

FIGURE 2 is a fragmentary sectional illustration, on line 2—2 of FIGURE 1, illustrating the movable association between the upper micrometer and the protractor plate.

FIGURE 3 is a fragmentary elevational illustration of the lower micrometer barrel and the vernier dial mounting attached thereto.

FIGURE 4 is a side elevational view of the invention.

FIGURE 5 is a fragmentary sectional view showing the pivotal and slidable connection between the lower micrometer and the angle scale, and between these elements and the protractor plate.

FIGURE 6 illustrates a right-angle triangle by which the side $a$ thereof has been determined by use of the invention as set in the manner shown in FIGURES 8, 9, and 10.

FIGURE 7 is another right-angle triangle by which the side $a$ has been determined by setting the angle scale and micrometers as indicated in FIGURES 8, 9 and 10.

FIGURE 8 illustrates a vernier and protractor setting to 30 degrees from vertical, both micrometers reading zero.

FIGURE 9 shows the micrometers in locked positions at 30 degrees from vertical whereby the stock of the upper micrometer is adjusted to be adjusted to engage the angle scale arm.

FIGURE 10 illustrates another setting of the angle scale, and both micrometers to 30 degrees from vertical reading, respectively 250 and 500.

FIGURE 11 illustrates a trigonometrical solution of the measurement of the side $c$ of the right-angle triangle shown in FIGURE 7.

FIGURE 12 illustrates a right-angle triangle whose side $b$ is determined by the settings illustrated in FIGURES 13, 14 and 15.

FIGURES 13, 14 and 15 illustrate the steps in setting the invention to determine the measurement of the unknown side of the triangle shown in FIGURE 12.

FIGURE 16 illustrates a trigonometricol solution to determine the side $b$ of the triangle shown in FIGURE 12.

FIGURE 17 illustrates an obtuse triangle whose unknowns can be determined by computing the right-angle laterals shown in dotted lines.

FIGURE 18 fragmentarily illustrates, in elevation, the sliding association between the angle scale with the protractor plate, and FIGURE 19 is a fragmentary sectional illustration on line 19—19 of FIGURE 18, showing the locking and impelling device for the angle scale on the protractor plate.

The mechanical structure of the invention is best illustrated in FIGURES 1, 2, 3, 4, 5 and 19, and comprises, primarily, a protractor plate 10 which is generally semi-circular in form, as shown in FIGURE 1, and has an angular portion 11 which affords a convenient handle. A protractor scale 12 is imprinted on the face 13 of the plate 10 and spaced inwardly from and conforming to the outer semi-circular periphery 14 thereof. An annular boss 15 is formed about the periphery 14 and on the rear face 16 of the plate 10, as shown in the fragmentary sectional view of FIGURE 2, and has an annular channel 17 therein with an annular slot 18 open to the face 13 of the plate 10 and whose function will presently become apparent.

The face 13 of the plate 10 is divided by vertical and horizontal lines 19 and 20, respectively, defining a pair of segments 21 and 22, each bearing division markings indicating 90 degrees. In alignment with the vertical line 19 and spaced below the horizontal line 20 is a vertical slot 23 formed in the angular portion 11 of the plate 10, the purpose of which will also become apparent as the description proceeds.

Attached to the lowermost point 24 of the angular portion 11 of the plate 10 is a micrometer 25, the outer end of the scaled stock 26 of which is embraced by a collar 27 which is secured to the member 24, as indicated in FIGURES 1 and 4, and has an integral bracket 28 which supports a vernier dial 29. The stock 26 of the micrometer 25 has a stem 30 extending axially therefrom and the outer end of the stem 30 is milled to form a shoulder 31 and a head 32, as shown in FIGURE 5, defining spindle 33 for a bearing 34. A fitting 35 is pressed on the bearing 34 to provide a rotative association between the stem 30 and the fitting 35 so that the latter is restrained from rotation by a pin 36 thereon extending through the slot 23 of the plate 10 when the stock 26 of the micrometer 25 is extended and retracted in the operation thereof.

The fitting 35 is bifurcated to form a slot 37 transversely of the axis of the stem 30, as shown in FIGURE 5, to receive the lowermost end of an angle scale 38 which is pivotally secured to the fitting 35 by a knurled screw 39 whereby the angle scale 38 can be moved across the plate 10 and aligned at different angular positions with the markings on the protractor scale 12, as illustrated in FIGURE 1. With this arrangement the pivot of the angle scale 38 can be moved along the slot 23 while it assumes a desired angle aligned with a mark on the protractor scale 12. The screw 39 will function to set the scale 38 at any desired angle.

The operative edge 40 of the angle scale 38, as will be noted by reference to FIGURE 1, is aligned with the axis of the screw 39 and thus is capable of true alignment with the arcuate arrangement of markings on the protractor scale 12. The angle scale 38 has a circular body portion 41 intermediate its ends in which is provided a vernier scale 42 alignable with the markings on the protractor scale 12, the center line of the vernier scale 42 being aligned with the operative edge 40 of the angle scale 38.

Attached to the upper arcuate edge 14 of the plate 10 is another micrometer 43 which also has a stock 44 and a stem 45 extending axially from the outer end of the latter. Embracing the end of the stock 44 is a sleeve 46 forming a part of a bracket 47 which has a shoe 48 formed thereon, and offset at 49, as shown in FIGURE 2, slidably disposed in the channel 17, the offset element 49 extending through the annular slot 18 whereby the micrometer 43 can be moved about the periphery 14 of the plate 10 and set at any desired point by a knurled screw 50, as illustrated in FIGURES 1 and 2.

Formed with the sleeve 46 is a bracket 51 by which a vernier dial 52 is supported on the micrometer stock 44 in a manner similar to the dial 29 on the micrometer stock 26. Each of the pointers 53 and 54, respectively, of the dials 29 and 52 are geared to the stems 30 and 45, respectively, of the micrometers 25 and 43 so as to indicate the divisions on the dials 29 and 52 in accordance with the readings of the scales 55 and 56 of the respective stocks 26 and 44 when the respective micrometers are operated. The gearing arrangement of the two indicator dials is identical. The relationship of each to its respective micrometer in gearing ratio is 25 to 1. The fractional breakdown will thus result in a tolerance of one-thousandth of a unit.

Illustrated in FIGURES 18 and 19 is a modified arrangement of the mechanism for adjusting the micrometer 43 about the arcuate plate 10 in which a series of teeth 57 is formed about the inner wall of the channel 17 with which a gear 58 is meshed, as best shown in FIGURE 19.

The gear 58 has an integral shaft 59 which extends concentrically through the stem 60 formed with a shoe 61 slidably arranged in the channel 17 adjacent to the gear 58. The stem 60 is exteriorly threaded and has a lock-nut 62 threaded thereon by which the micrometer 43 can be fixed when properly set. The nut 62 can be rotated by a pin 63 whose inner end is threaded into the nut 62. The mounting bracket 42 of the micrometer 43 is arranged on the stem 60 and secured by a nut 64. The gear 58 is rotated for moving the micrometer 43 along the slot 18 by a knurled knob 65 on the shaft 59, and for micromatic adjustment a smaller knurled knob 66 is provided on the outer end of the shaft 59.

It will be observed, by reference to all of the illustrations in which the micrometers 25 and 43 are shown, that the former is always in axial alignment with the vertical line 19 on the protractor plate 10 and the latter is positioned so that its longitudinal axis is tangential to the curvature of the protractor scale 12, or at an angle of approximately 30 degrees from the horizontal line 20, as shown in FIGURES 8, 9 and 10, and 60 degrees, as shown in FIGURES 13, 14 and 15, and such angle is maintained constant regardless of the rotative position of the micrometer 43 on the plate 10.

For the proper function of the invention, as will become apparent, the micromatic scale 56 on the stock 44 of the micrometer 43 reads in reverse to that of the scale 55 of the micrometer 25, or reading from .001″ when the stock 44 is fully extended to 1.0″ when retracted, as shown in FIGURE 1. The pointers 53 and 54 on the dials 29 and 52 are geared to move, as the stocks of the respective micrometers are extended or retracted, to indicate fractions of the units of measurements employed.

Examples of the application of the invention are illustrated in FIGURES 6, 7, 12 and 17 in which unknown measurements of one or more sides of triangles are determined. In FIGURES 6 and 7 the sides c, between A and B, of the respective triangles are known to be 250 units. The procedure to determine the unknown measurement of side a, FIGURE 6 or 7, is illustrated in FIGURES 8, 9 and 10 and is pursued in the following manner:

First, set the micrometer 43 to read zero on its scale 56, and the stem 45 will protrude, as in FIGURE 8. Second, move the angle scale 38 to read 30 degrees from the vertical line 19 on the protractor scale 12 and lock. Third, move the micrometer 43 toward the angle scale 38 until the stem 45 touches the same and lock in position. Fourth, move the angle scale 38, while the micrometer 43 is still locked, away from the stem 45, as shown in FIGURE 9, by turning the micrometer 25 to retract its stem 30. Fifth, turn the micrometer 43 to read 250. Sixth, move the angle scale 38 to the right by turning the micrometer 25 until the scale 38 touches the stem 45 of the micrometer 43. The reading on the scale 55 of the micrometer 25 will show the unknown measurement of the side a which is 500′.

The solution to the determination of the length of the side a by trigonometry is:

$$a = c \times \text{cosecant } C$$
$$a = 250 \times 2.000$$
$$a = 500'$$

as illustrated in FIGURE 11.

The procedure for finding the unknown measurement of the side b of the triangles illustrated in FIGURES 6 and 7 is shown in FIGURES 13, 14 and 15 and comprises the following steps, illustrated in FIGURE 13:

First, set the micrometer 25 on zero. Second, move the angle scale 38 to read 30 degrees from the horizontal line 20 on the protractor scale 12, or 60 degrees from the vertical line 19, and lock in position by the knurled screw 39. Third, move the micrometer 43 toward the angle scale 38, with its code 56 reading zero, until the stem 45 touches the angle scale 38 and lock the micrometer 43.

As illustrated in FIGURE 14, the fourth step is to turn the micrometer 25 until it reads the value found in determining the length of a as previously described. The angle scale 38 will move to the left.

The procedure shown in FIGURE 15, which is the last step, which consists of turning the micrometer 43 until its stem 45 touches the angle scale 38 at which point the micrometer 43 will show the unknown length of the side b which is 433′.

In trigonometry, the solution is as follows:

$$b = c \times \text{cotangent } C$$
$$b = 250 \times 1.7320$$
$$b = 433'$$

as illustrated in FIGURE 16.

In the use of the invention in various fields, in which a variety of units of measure is employed, such as inches, feet, yards, rods, chains, miles, etc., any such unit can be represented in one-thousandth, such as .001 inch or .001 foot, etc. For example, a given measurement of the hypotenuse side of a triangle is 571 feet and 9 inches. If such determination is made by the invention the setting of the micrometer 25 would read .571' on its scale 55 and the dial pointer 53 would indicate .750 (or three-fourths of 1000) representing 9 inches, thus the total reading is 571' and 9". The length of the stock scale on each of the micrometers 25 and 43 is one inch, and the divisions indicate .001". These divisions can be translated into any unit desired, or broken down into lesser units.

It is pointed out that although all of the calculations are to be made within the ninety degree segment, as best illustrated in FIGURE 1 which shows the angle scale 38, with its operative edge 40, on the left side or segment, the opposite segment on the right side may be utilized simply by reversing the arrangement of the member 38 and the micrometer 43 with its associated parts.

The structural arrangement of the invention is capable of certain changes and modifications without departing from the spirit and intent thereof or the scope of the appended claims.

What is claimed is:

1. An instrument for computing unknown measurements of one side of a triangle, and the like, comprising a protractor plate having a 180 degree scale thereon and having an annular channel formed peripherally thereof in one face, an angle scale pivotally attached at its inner end centrally of said plate and having a vernier scale thereon alignable with said protractor scale, the said angle scale being movable with respect to the axis of said protractor scale, a first micrometer adjustably attached to the outer periphery of said protractor and slidable along said annular channel, the said first micrometer having a scaled stock and a stem in said stock extensible and retractable in response to the rotation of the handle of said micrometer to engage said angle scale, a second micrometer secured to said protractor plate opposite said scale thereon and having a scaled stock and a stem in said stock extensible and retractable in response to rotation of the handle of said second micrometer, whereby the angle of said angle scale can be micromatically adjusted with respect to the axis of said protractor scale and its angle measured by said first micrometer.

2. An instrument for computing the unknown measurements of one side of a triangle, comprising, a protractor plate having a handle portion and a 180 degree protractor scale thereon, a first micrometer having a handle, a scaled stock and a stem in said stock extensible and contractable when said handle is rotated, the said first micrometer being adjustably secured to the peripheral rim of said protractor, a second micrometer having a handle, a scaled stock and a stem extensible and contractable in response to rotation of its handle, secured to the handle portion of said protractor plate an angle scale having a vernier scale thereon alignable with said protractor scale and having its inner end pivotally attached to the outer end of the stem of said second micrometer whereby, when the latter is extended or retracted the said angle scale is moved with respect to the axis of said protractor scale, and whereby said angle scale can be moved pivotally along said protractor scale and its angle measured by said first micrometer.

3. An instrument for computing the unknown side of a triangle, comprising a protractor plate having a handle portion and a protractor scale opposite said handle portion, an angle scale having a vernier scale thereon alignable with said protractor scale, a micrometer slidably attached to the periphery of said protractor scale and capable of fixed adjustments with respect thereto, the said micrometer having an extensible and contractable stem for engagement with said angle scale at predetermined angulations thereof, a second micrometer attached to the handle portion of said protractor and having a stem, the inner end of said angle scale being pivotally attached to the outer end of the stem of said second micrometer whereby said angle scale is adjustable with respect to the axis of said protractor and whereby the degree of its angulation can be measured by said first micrometer.

4. An instrument for determining the unknown sides of a right-triangle where two angles and one side are known, comprising a protractor plate having a scale thereon and having an angle scale pivoted thereon and having a scale cooperating therewith, micrometer means on said plate having an extensible and contractable stem providing a pivotal mounting for said angle scale whereby the latter can be moved with respect to the axis of said protractor scale, and a second micrometer adjustable peripherally of said protractor scale and having an extensible and contractable stem engageable with the outer end of said angle scale at different angles thereof.

References Cited

UNITED STATES PATENTS

| 997,989 | 7/1911 | Glickert | 33—97 |
| 3,014,646 | 12/1961 | Gabriel | 235—61 |
| 3,088,210 | 5/1963 | Cunningham et al. | 235—61 |

FOREIGN PATENTS

| 192,470 | 8/1888 | France. |
| 29,458 | 5/1904 | Switzerland. |

RICHARD B. WILKINSON, *Primary Examiner.*

S. A. WAL, *Assistant Examiner.*